(12) United States Patent
Kottapalli et al.

(10) Patent No.: US 11,431,822 B2
(45) Date of Patent: *Aug. 30, 2022

(54) METHODS, APPARATUS, AND SYSTEMS TO DYNAMICALLY DISCOVER AND HOST SERVICES IN FOG SERVERS

(71) Applicant: VMWARE, INC., Palo Alto, CA (US)

(72) Inventors: Ravi Kumar Reddy Kottapalli, Bangalore (IN); Shubham Verma, Bangalore (IN); Suket Gakhar, Bangalore (IN); Kannan Balasubramanian, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/095,416

(22) Filed: Nov. 11, 2020

(65) Prior Publication Data

US 2021/0067602 A1 Mar. 4, 2021

Related U.S. Application Data

(63) Continuation of application No. 15/993,622, filed on May 31, 2018, now Pat. No. 10,841,397.

(30) Foreign Application Priority Data

Apr. 17, 2018 (IN) .............................. 201841014549

(51) Int. Cl.
*H04L 12/00* (2006.01)
*H04L 67/60* (2022.01)
(Continued)

(52) U.S. Cl.
CPC .............. *H04L 67/32* (2013.01); *H04L 47/76* (2013.01); *H04L 67/16* (2013.01); *H04L 67/42* (2013.01)

(58) Field of Classification Search
CPC ......... H04L 67/32; H04L 67/16; H04L 67/12; H04L 67/42; H04L 47/76; H04L 47/781
(Continued)

(56) References Cited

U.S. PATENT DOCUMENTS 8,065,395 B2 * 11/2011 Burch ................. H04L 63/0281
709/219
10,397,039 B2 * 8/2019 Zhang ................. H04B 17/309
(Continued)

FOREIGN PATENT DOCUMENTS

WO 2015084628 6/2015
WO 2017212036 12/2017
WO WO-2017212036 A1 * 12/2017 ............. H04L 67/28

OTHER PUBLICATIONS

United States Patent and Trademark Office, "Notice of Allowance," mailed in connection with U.S. Appl. No. 15/993,622, dated Jul. 8, 2020, 14 pages.
(Continued)

*Primary Examiner* — Frantz Coby
(74) *Attorney, Agent, or Firm* — Hanley, Flight & Zimmerman, LLC

(57) ABSTRACT

Methods, apparatus, systems and articles of manufacture to dynamically discover and host services in fog servers are disclosed. An example apparatus includes a service manager to determine that a received service request from an Internet of things (IoT) device is not able to be performed locally at a first fog server; a first interface to transmit the service request to a fog resource manager; and a second interface to transmit instructions to the IoT device to transmit the service request to a second fog server, a response from the fog resource manager including service data related to the second fog server.

18 Claims, 9 Drawing Sheets

(51) Int. Cl.
*H04L 67/01* (2022.01)
*H04L 47/76* (2022.01)
*H04L 67/51* (2022.01)

(58) Field of Classification Search
USPC .................................................. 709/201, 203
See application file for complete search history.

(56) References Cited

U.S. PATENT DOCUMENTS

| | | | | |
|---|---|---|---|---|
| 10,644,961 | B2* | 5/2020 | Nolan | H04L 41/12 |
| 10,841,397 | B2* | 11/2020 | Kottapalli | H04L 67/42 |
| 2008/0115143 | A1 | 5/2008 | Shimizu et al. | |
| 2013/0332938 | A1 | 12/2013 | Deschler et al. | |
| 2016/0105305 | A1 | 4/2016 | Pignataro et al. | |
| 2016/0173495 | A1 | 6/2016 | Joo | |
| 2016/0182639 | A1 | 6/2016 | Hong | |
| 2017/0048308 | A1* | 2/2017 | Qaisar | H04L 67/12 |
| 2017/0060574 | A1 | 3/2017 | Malladi et al. | |
| 2017/0201585 | A1 | 7/2017 | Doraiswamy et al. | |
| 2017/0295109 | A1 | 10/2017 | Byers et al. | |
| 2017/0300693 | A1 | 10/2017 | Zhang et al. | |
| 2018/0176317 | A1 | 6/2018 | Hwang et al. | |
| 2018/0337820 | A1 | 11/2018 | Chen et al. | |
| 2019/0035018 | A1* | 1/2019 | Nolan | H04L 9/3236 |
| 2019/0102850 | A1* | 4/2019 | Wheeler | G06Q 20/405 |
| 2019/0190789 | A1 | 6/2019 | Zhang et al. | |
| 2019/0292469 | A1 | 9/2019 | Banerjee | |
| 2020/0050494 | A1* | 2/2020 | Bartfai-Walcott | G06F 9/5083 |

OTHER PUBLICATIONS

United States Patent and Trademark Office, "Non-final Office Action," mailed in connection with U.S. Appl. No. 15/993,622, dated Jan. 10, 2020, 36 pages.

* cited by examiner

METHODS, APPARATUS, AND SYSTEMS TO DYNAMICALLY DISCOVER AND HOST SERVICES IN FOG SERVERS

RELATED APPLICATIONS

This patent arises from a continuation of U.S. Pat. No. 10,841,397 which issued on Nov. 17, 2020. U.S. Pat. No. 10,841,397 is hereby incorporated herein by reference in its entirety. Priority to U.S. Pat. No. 10,841,397 is hereby claimed. In addition, benefit is claimed under 35 U.S.C. 119(a)-(d) to Foreign Application Serial No. 201841014549 filed in India entitled "METHODS, APPARATUS, AND SYSTEMS TO DYNAMICALLY DISCOVER AND HOST SERVICES IN FOG SERVERS", on Apr. 17, 2018, by VMware, Inc., which is herein incorporated in its entirety by reference for all purposes.

FIELD OF THE DISCLOSURE

This disclosure relates generally to fog servers, and, more particularly, to methods, apparatus, and systems to dynamically discover and host services in fog servers.

BACKGROUND

In recent years, fog computing has brought data processing, networking, storage and analytics closer to devices and/or applications that are working at a network's edge. The fog is a resource-rich layer between the cloud and edge devices. Fog computing enables computing devices (e.g., fog servers) to reside at the edge of the network as opposed to within a datacenter in the cloud. Accordingly, such computing devices provide a low and predictable latencies to edge devices. Additionally, fog computing provides a higher bandwidth to edge devices than a cloud. Fog computing aids the ever increasing popularity of the Internet of things (IoT) by providing efficient and fast services to IoT devices.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
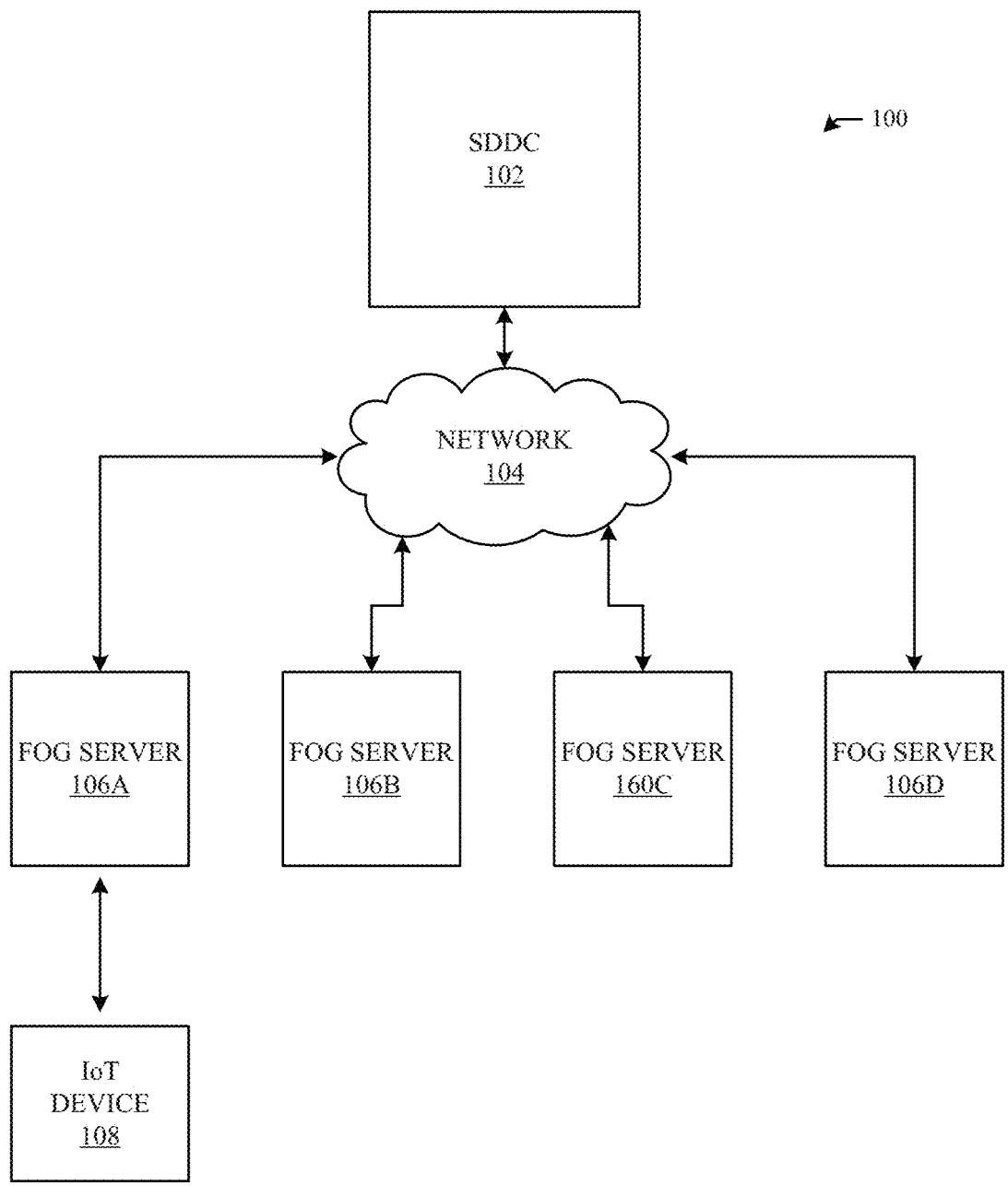
FIG. 1 is an illustration an environment in which of an example fog resource manager operates to discover and host services for a network of fog servers.

The fog is the resource-rich layer between cloud and devices that includes resources to reduce the processing burden of cloud systems. Fog computing brings data processing, networking, storage and analytics closer to the devices and applications that are working at the network's edge. Bringing processing, networking, storage, and analytics closer to the edge of the network allows a large number of connected devices and applications to consume cloud-type resources and generate large amounts of data in a manner that is more efficient (e.g., with lower latency) than conventional software defined data centers operating in the cloud because fog computing does not require transmitting large amount of data back over networks to central data centers. Conventional processing techniques for IoT utilize edge gateways (e.g., capable of performing lightweight services) or cloud-based data centers to execute service request. For example, in conventional processing techniques for IoT, an Internet of things (IoT) device may transmit a service request to an edge gateway. In response, the edge gateway services the request (e.g., if the service request is small and the edge gateway is capable of executing the lightweight request) or the edge gateway sends the service request to the cloud-based data center to be executed.

Examples disclosed herein include fog servers to execute services related to data processing, networking, storage and analytics. Such fog servers receive service requests from Internet of things (IoT) devices and execute (e.g., perform functions related to) the service requests in a manner that is fast and efficient. However, fog servers generally do not have as many resources as software defined data centers that operate in the cloud. For example, a fog server may include X number of execution units (e.g., containers, virtual machines, processing units, etc.) to perform X services, while a software define data center located in the cloud may be able to execute 100X services. Accordingly, the number of services that a particular fog server can execute is limited compared to cloud-based services. Examples disclosed herein provide a solution to conventional techniques by leveraging the speed and efficiency of fog servers while overcoming the limited functionality of the fog servers.

Examples disclosed herein include a fog resource manager to deploy services to a network of fog servers and manage the execution of such services to outsource service requests when one or more fog servers are unable to service received requests. The Fog Resource Manager is a Hardware Management System (HMS) for hardware resources that exist outside a conventional data center or a conventional software-defined datacenter (SDDC) (e.g., in the fog layer). The fog resource manager can discover the hardware resources outside the datacenter and populate the physical inventory of the datacenter. In some examples, in a SDDC, instead of the physical inventory, a dedicated fog resources inventory can be populated. In such examples, the logical inventory (used by different IaaS components of SDDC) will retrieve inventory data from both the physical inventory as well as fog resource inventory. For example, if a fog server receives a request to perform a service (e.g., processing, networking, storage, and/or analytics service) from a requesting device, the fog server attempts to service the request based on the availability of the execution units within the fog server that can execute the service. If the fog server determines that it is unable to service the request (e.g., because the fog server is not configured to perform the requested service, the fog server currently does not have the resources to perform the requested service, or the service has failed locally), the fog server transmits the service request to the fog resource manager. In response to receiving a service request from the requesting fog server, the fog resource manager selects another fog server(s) within the network of fog servers that is capable of executing the service request and transmits the service details back to the requesting fog server, thereby allowing the requesting fog server to discover that the selected fog server is able to execute the request. In this manner, the requesting fog server can outsource the service request to the fog server selected by the fog resource manager. Once the selected fog server executes the request, the results may be returned to the requesting fog server and forwarded to the requesting device. In some examples, when the requesting fog server receives the selected fog server details from the fog resource manager, the requesting fog server instructs the requesting device to transmit the service request directly to the selected fog server to service the request. Using examples disclosed herein, the speed and efficiency of fog computing is combined with the large resource power of a software defined data center, which is both flexible and scalable to a large number of fog servers.

FIG. 1 is an illustration of an example environment 100 in which a fog resource manager to discover and host services for a network of fog servers. The example environment 100 includes an example SDDC 102, an example network 104, example fog servers 106A-D, and an example IoT device 108. Although the illustration of example FIG. 1 includes one SDDC, four fog servers, and one IoT device, any number of SDDCs (e.g., a primary SDDC including a primary FRM and secondary SDDC(s) including secondary FRM(s)) (e.g., if the connectivity between the primary FRM and a corresponding fog server goes down, the secondary FRM can manage the fog server), fog servers (e.g., registered the one or more SDDCs), and/or IoT devices may be included in the network of devices.

The example SDDC 102 of FIG. 1 is a virtualization of all data center resources to achieve infrastructure as a service (IaaS). For example, the SDDC 102 may be a cloud-based service including SDDC resources, virtual rack managers, workloads, workload domains, etc., that enable a fully automated infrastructure for an application or hardware. The example SDDC may be a private, public, or hybrid data center for private, public, or hybrid cloud services. In some examples, the SDDC 102 performs services for the example IoT device 108 (e.g., when the example fog servers 106A-D are not available to perform the requested services). However, because the containers (e.g., the execution units for serverless functions) of the SDDC 102 have to be warm booted to immediately serve an incoming request, the warm booted containers available on the fog servers can be utilized to serve the client requests. For example, if there is a fog server (e.g., that is already booted-up and hosting warm-booted containers) available to service the request, the example SDDC 102 defaults to identifying the fog server as opposed to executing the service locally. An example implementation of the example SDDC 102 is further described below in conjunction with FIG. 2.

The example SDDC 100 of FIG. 1 includes a fog resource manager that discovers, registers, and manages the example fog servers 106A106D. In this manner, the fog resource manager managers services that are outside of the example SDDC 102. The fog resource manager images (e.g., by installing a hypervisor and cloud foundation services) the fog servers 106A106D, discovers the fog resources, determines the services provided by each fog server 106A-106D, and registers the fog servers 106A-106D. In some example the fog servers 106A-D may be locally imaged by a local administrator and then register to the SDDC 100. The fog resource manager populates the hardware resource inventory tables of the SDDC 102 with added/removed fog nodes, including details for each fog server (e.g., identification number, name, imaging status, connectivity status, status of cloud foundation services running on fog server, etc.). The fog resource manager may also maintain service tables to know the status of the services (e.g., payloads like containers or serverless functions like lambda/dispatch/openwhisk/ etc.). The fog resource manager host services for a network of fog servers when one of the fog servers cannot perform a requested service. For example, if the example IoT device 108 requests a service from the example fog server 106A and the example fog server 106A cannot perform the requested service, the example fog server 106A transmits the service request to the fog resource manager via the example network 104. In such an example, the fog resource manager looks at the service tables of the other fog servers 106B-D in the network to determine which of the example fog servers 106B-D can perform the service. A service table includes information related to services provided by a particular fog server and the availability of such services at the particular fog server. In some examples, if more than one fog server 106B-D can perform the service, the fog resource manager may select the fog server that is closest (e.g., based on location) to the example fog server 106A. In some examples, if there are no fog servers 106B-D that can perform the service or no fog servers within a threshold distance that can perform the service, then the fog resource manager may transmit the service request to a virtual resource manager (VRM) backend of the example SDDC 102 to execute the service locally at the example SDDC 102. The fog resource manager manages the functionalities of the example fog services 106A-D by managing fog service tables that correspond to the resources, resource availability, load, services, location, etc. corresponding to the example fog servers 106A-D. The fog resource manager is further described below in conjunction with FIG. 3. The example SDDC 102 of FIG. 1 discovers the example fog servers A-D.

The example network 104 of FIG. 1 is a system of interconnected systems exchanging data. The example network 104 may be implemented using any type of public or private network such as, but not limited to, the Internet, a telephone network, a local area network (LAN), a cable network, a cloud network, and/or a wireless network. To enable communication via the network 104, the example fog servers 106A-D and/or the example SDDC 102 include a communication interface that enables a connection to an Ethernet, a digital subscriber line (DSL), a telephone line, a coaxial cable, or any wireless connection, etc.

The example fog servers 106A-D of FIG. 1 are devices between the cloud and the edge that receive service request from devices (e.g., IoT devices), directly or indirectly. For example, the fog servers 106A-D may receive service requests directly from an IoT device or via a gateway or other server. The example fog servers 106A-D are configured to perform particular services (e.g., storage, analytics, image processing, mathematical processing, and/or any other type of processing). For example, the fog servers 106A-D may include hardware, software, and/or firmware that may be configured to perform particular services. The example fog servers 106A-D include hardware-based virtualization mechanisms to implement fog platforms. Fog servers 106A-D may include operating-system level virtualization (e.g., containers to perform particular tasks). In some examples, the example SDDC 102 deploys the services to the example fog servers 106A-D and the fog server 106A-D configure their nodes/execution units (e.g., containers, virtual machines, processing units, etc.) to be able to execute the services. An example of the example fog server 106A is further described below in conjunction with FIG. 2. During initiation, the example fog servers 102A106D register to the example SDDC 102.

The example fog servers 106A-106D of FIG. 1 each include a NSX ESG to facilitate sourcing of service requests when a fog server receiving the service request is currently unable to service the request. For example, when the NSX ESG of the first fog server 106A receives a service request from the example IoT device 108, the NSX ESG determines if the example fog server 106A can service the request (e.g., based on a service table identifying how the nodes/execution units are configured and the availability of such nodes/execution units). The example fog server may not be able to service the request when, for example, the available resources of the fog server 106A are low and/or when the fog server 106A is not configured to execute the service. In such an example, if the NSX ESG of the first example fog server 106A is able to service the request, the NSX ESG stores the service request in its service table and transmits the updated service table to the example SDDC 102, thereby allowing the SDDC 102 to monitor the resources of the example fog servers 106A-106D. If the NSX ESG of the first example fog server 106A is not able to service the request, the NSX ESG transmits the request to the example fog resource manager 201 and service request details from the example fog resource manager 201. The service request details may include details related to a second fog server (e.g., the example fog server 106B) that is able to service the request and/or may have the request results (e.g., if the request was serviced by the example SDDC 102). In some examples, the service request details corresponds to a relative location of the example fog server 106B (e.g., which may relate to whether client migration is possible). Client migration includes instructing the example IoT device 108 to transmit a service request to the fog server identified in the service request details for servicing. In some examples, after receiving the service details, the NSX ESG of the first example fog server 106A may cache the service request in its service table and transmit the service request to the example fog server 106B to execute the service.

The example IoT device 108 of FIG. 1 is a device that requests services and/or provides data to be processed by the example fog servers 106A-D. For example, the device 108 may be a sensor providing images to the example fog servers 106A-D that are to be processed/pre-processed. In some examples, the IoT device 108 transmits the data and/or service request to the example fog servers 106A-D directly. In some examples, the IoT device 108 may transmit the data and/or service request to the example fog servers 106A-D via another device (e.g., a gateway or another server). In such examples, the edge gateway/server may run IoT software and include a data center component (DCC) (e.g., a data-structure storing fog server and datacenter or SDDC details) indicating the datacenter or SDDC to which the IoT software is registered to. In this manner, any service request received by at the gateway is forwarded to the fog server identified in the DCC. In some examples, the fog server may instruct the DCC of the gateway to update its DCC to correspond to a different fog server (e.g., when the requested service cannot be executed by the local fog server). The example IoT device 108 may be any device capable of communication via a network connection.

Figure 2:
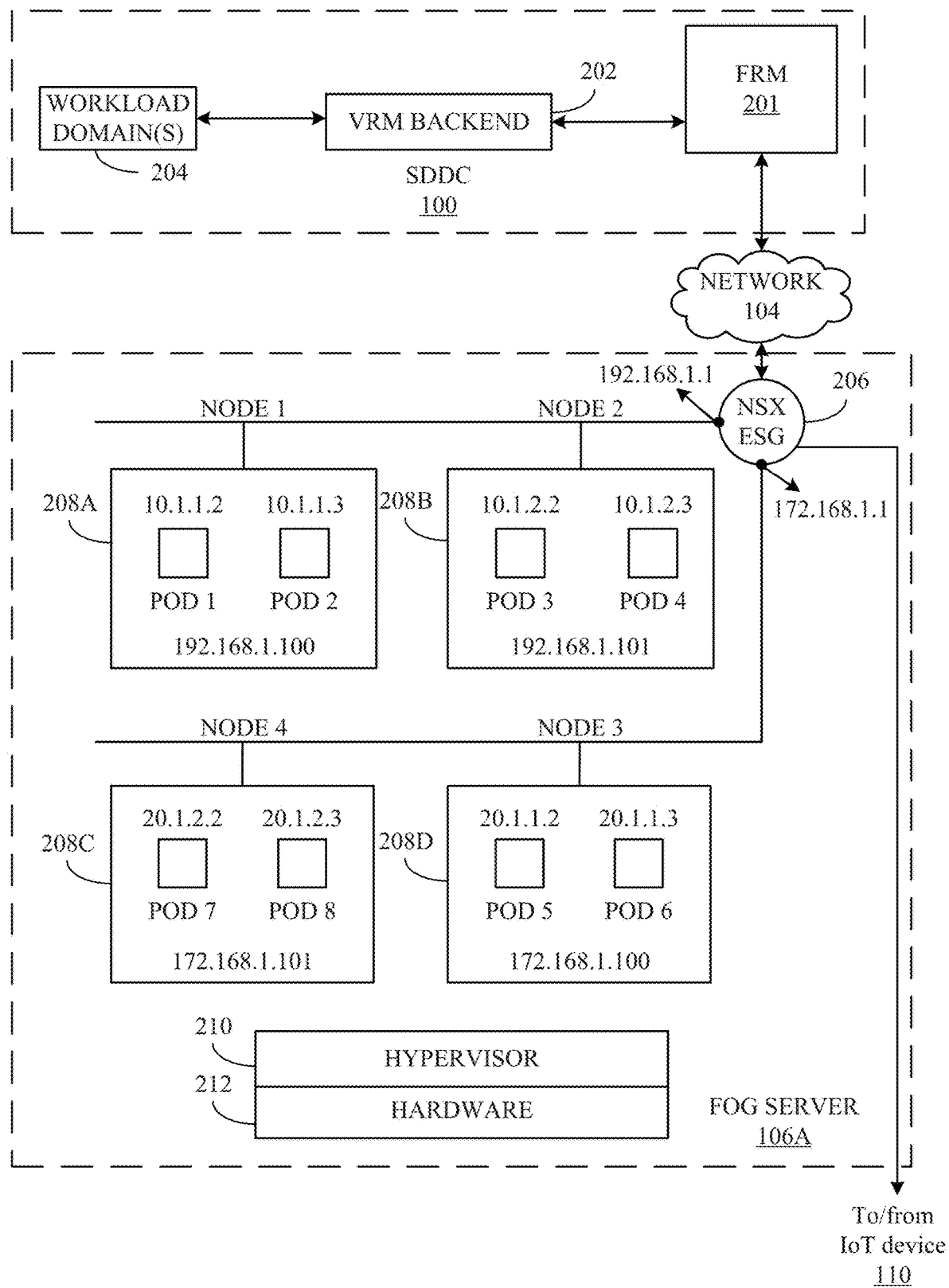
FIG. 2 includes block diagrams of example implementations of the example software-defined data center (SDDC) and the example fog server of FIG. 1.

FIG. 2 includes an example implementation of the example SDDC 102 and the example fog server 106A of FIG. 1. Although FIG. 2 is described in conjunction with the example fog server 106A of FIG. 1, the example implementation of FIG. 2 may be described in conjunction with any of the example fog servers 106A-D. The example SDDC 102 of FIG. 2 includes an example fog resource manager (FRM) 201, an example VRM backend 202, an example workload domain(s) 204. The example fog server 106A includes an example NSX ESG 206, example nodes 208A-D, an example hypervisor 210, and example hardware 212.

The example VRM backend 202 of FIG. 2 manages the resources of the example SDDC 102. For example, the VRM backend 202 manages the physical hardware resources of the SDDC 102 to create and/or control virtual server racks that may span one or more physical racks to execute the example workload domain(s) 204. In this manner, when the example VRM backend 202 receives a service request from the example FRM 201, the VRM backend 202 transmits the request to the example workload domain(s) 204 to execute the request. The example workload domain(s) 204 is a generic abstraction of software and/or hardware that can be applied to a number of different types of compute workloads. For example, the workload domain 204 may be a Pivotal Container Service (SKU). In such an example, a request can be to immediately deploy a container with an image (e.g., Ubuntu16.04) and execute a process (e.g., image processing program) in the container. Once the example workload domains(s) 204 executes a service request, the results are returned to the example VRM backend 202. The example VRM backend 202 transmits the service request results to the example FRM 201.

The example nodes 208A-D of FIG. 2 each correspond to an address. The example nodes 208A-208B include pods which host execution units to execute service requests (e.g., perform instructions to execute one or more functions related to the service request). Each of the pods corresponds to an address. In this manner, the example NSX ESG 206 may instruct the execution units within the pods to execute service requests. In some example the NSX ESG 206 instructs another processor (e.g., the Kubernetes) to manage the execution of service requests by the pods. When the example NSX ESG 206 receives deployed services from the example FRM 201, the NSX ESG 206 instructs the pods of the example nodes 208A-D to configure their execution units to execute such services. Additionally, the example NSX ESG 206 may track the execution of services in the pods for each of the example nodes 208A-D. Although the example fog server 106A includes four nodes 208A-D each with two pods, the example fog server 106A-D may include any number of nodes with any number of pods corresponding to any address.

The example hypervisor 210 of FIG. 2 is a virtualization software (e.g., type 1 or type 2) that is running on the example hardware 212. The hypervisor 210 may run the virtual machine (e.g., Linux operating system) of the example fog server 106A. The example hypervisor 210 may host servers on the example fog server 106A. The example hypervisor 210 performs core virtualization functionalities of the example fog server 106A. The example hardware 212 may run routers, switches (e.g., Cicsco Ios xRv VM), etc. as virtual machines on hypervisor 210 and may include ccelerators (e.g., Nvidia GPU) to perform the functionality of the example fog server 106A.

Figure 3:
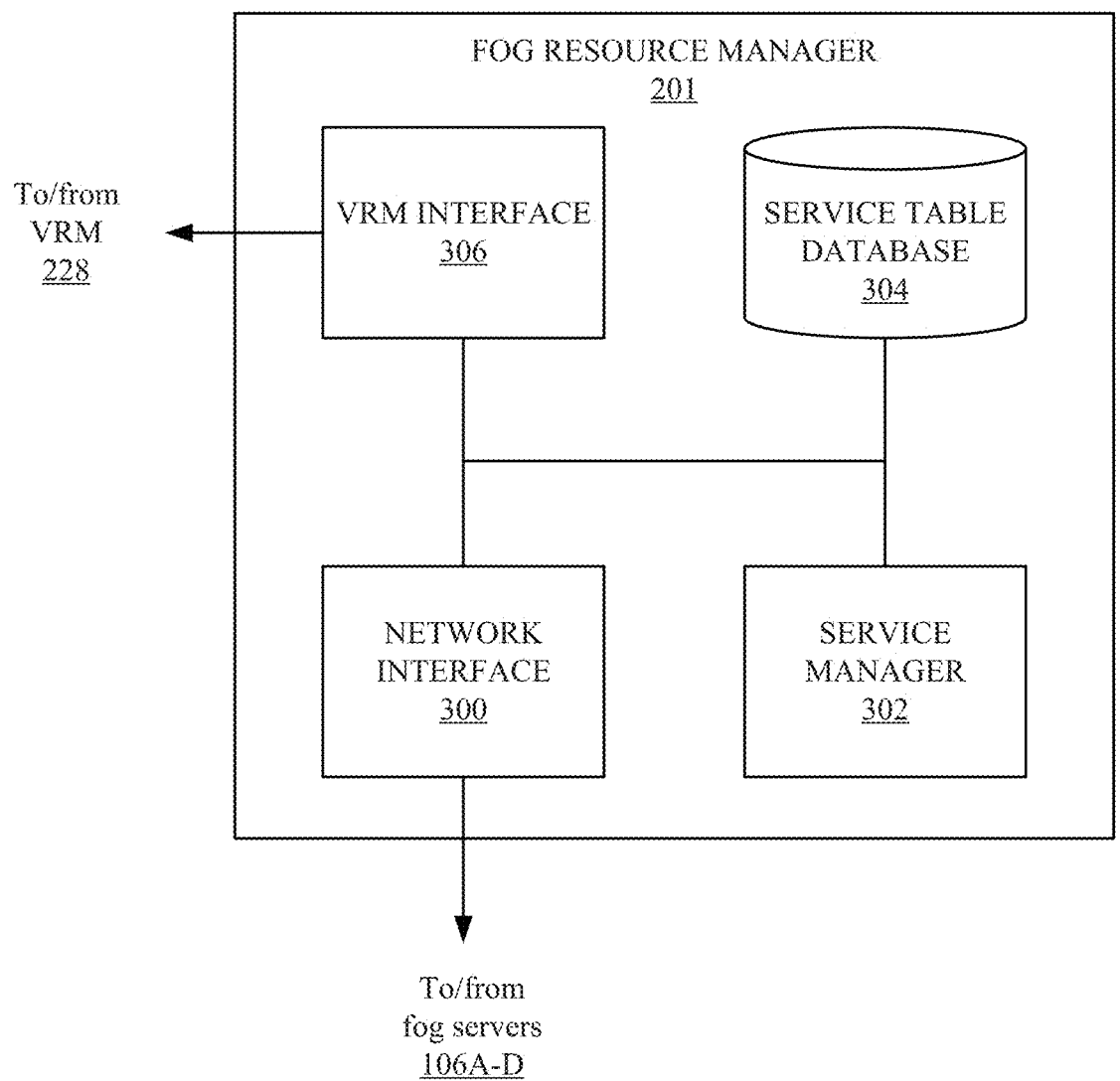
FIG. 3 is a block diagram of an example implementation of the example fog resource manager of FIGS. 1 and 2.

FIG. 3 is an example block diagram of the example fog resource manager 201 of FIGS. 1 and 2. The example fog resource manager 201 includes an example network interface 300, an example service manager 302, an example service table database 304, and the example VRM interface 306.

The example network interface 300 of FIG. 3 receives and/or transmits data to the example fog servers 106A-D via the example network 104 of FIG. 1. For example, the network interface 300 may transmit (e.g., deploy) services, service tables, white lists, and/or service details to the example fog servers 106A-D. A white list includes identifiers and/or addresses to alternate fog resource managers to use if/when the example fog resource manager 201 is down or busy. Additionally or alternatively, the example network interface 300 may receive service request and/or resource data updates from the example fog servers 106A-D.

The example service manager 302 of FIG. 3 manages services between the example fog servers 106A-D. In some examples, the service manager 302 determines which services should be performed at one or more of the example fog servers 106A-D and deploys the determined services to the one or more fog servers 106A-D by deploying service tables to respective fog servers. In such examples, the fog services 106A-D configure their nodes/execution units to execute the selected services. The service table is a table that corresponds to the services provided and being executed by a fog server. For example, the service table may include data related to available services for the fog server, node ports, node identifier, service type, name or service, resource availability, etc. Additionally, the example service manager 302 stores the deployed service table in the example service table database 304 and updates the service table based on service table updates (e.g., resource updates) made by the corresponding fog server (e.g., received at the example network interface 300). The example service manager 302 may update service tables based on an execution of a service is initiated by the first fog server, an execution of a service is terminated by the first fog server, when service throttling is initiated/terminated, an execution of a service has been migrated, an execution of a service has restarted, etc. In some examples, the resource update/service table includes an execution time corresponding to an amount of time that the execution unit will be reserved for to execute the service. In this manner, service throttling can be performed to provide a brake on long running services (e.g., if the input from the IoT device is such that the service hosted in the example fog server 106A takes more than a threshold duration of time). The service table/resource update may also correspond to an execution of a service is initiated by the first fog server, an execution of a service is terminated by the first fog server, when service throttling is initiated, an execution of a service has been migrated, or an execution of a service has restarted or paused.

When the example network interface 300 receives a service request from one of the example fog servers 106A-D, the example service manager 302 of FIG. 3 accesses the service tables for the example fog servers 106A-D to identify a fog server is capable of executing the service and has the necessary available resources to executing the service (e.g., without considering the fog server that forwarded the service request). If the example service manager 302 determines that there is more than one fog server that can service the request, the example service manager 302 may select a capable fog server based on its location relative to the fog server that forwarded the service request. In this manner, if client migration is supported, the fog server may be able to transmit the request to the capable fog server (e.g., if the capable fog server is within a threshold distance from the requesting fog server). If the example service manager 302 selects a fog server to execute the requested service that is not within the threshold distance, the example service manager 302 may include an indication that client migration is not possible (e.g., within the service details). Once the example service manager 302 selects the fog server, the example network interface 300 transmits the service details including an identifier and/or address of the selected fog service to the requesting fog server, to allow the requesting fog server to discover the available resources of the selected fog server. If the example service manager 302 determines that none of the example fog servers 106A-D are available to service the request, the example service manager 302 instructs the example VRM interface 306 to transmit the request to the example VRM backend 202 of FIG. 2. In this manner, the example SDDC 102 can execute the service request and return the results to the requesting fog server.

The example service table database 304 of FIG. 3 stores the service tables for each of the example fog servers 106A-D. Whenever one or more of the example fog servers 106A-D transmit a resource update to the example fog resource manager 201 (e.g., indicating that a service is currently being performed by a corresponding node in the fog server), the stored service tables are updated to reflect the resource update until the service is complete. In some examples, the fog servers 106A-D transmit resource updates with an execution time corresponding to how long it will take for the service to be throttled. In some examples, the fog servers 106A-D transmit a second resource update when the service is complete. Additionally, if the service manager 302 updates the services to be provided by the example fog servers 106A-106D, the service table database 304 updates the corresponding service table.

The example VRM interface 306 of FIG. 3 transmits service requests to the example VRM backend 202 when the example service manager 302 cannot find a fog server to execute the service request. In this manner, the example SDDC 102 can execute the service request and responds with the results of the service request. In response to receiving the service request results (e.g., service table updates), the example VRM interface 306 may forward the example network interface 300 to transmit to the requesting fog server.

Figure 4:
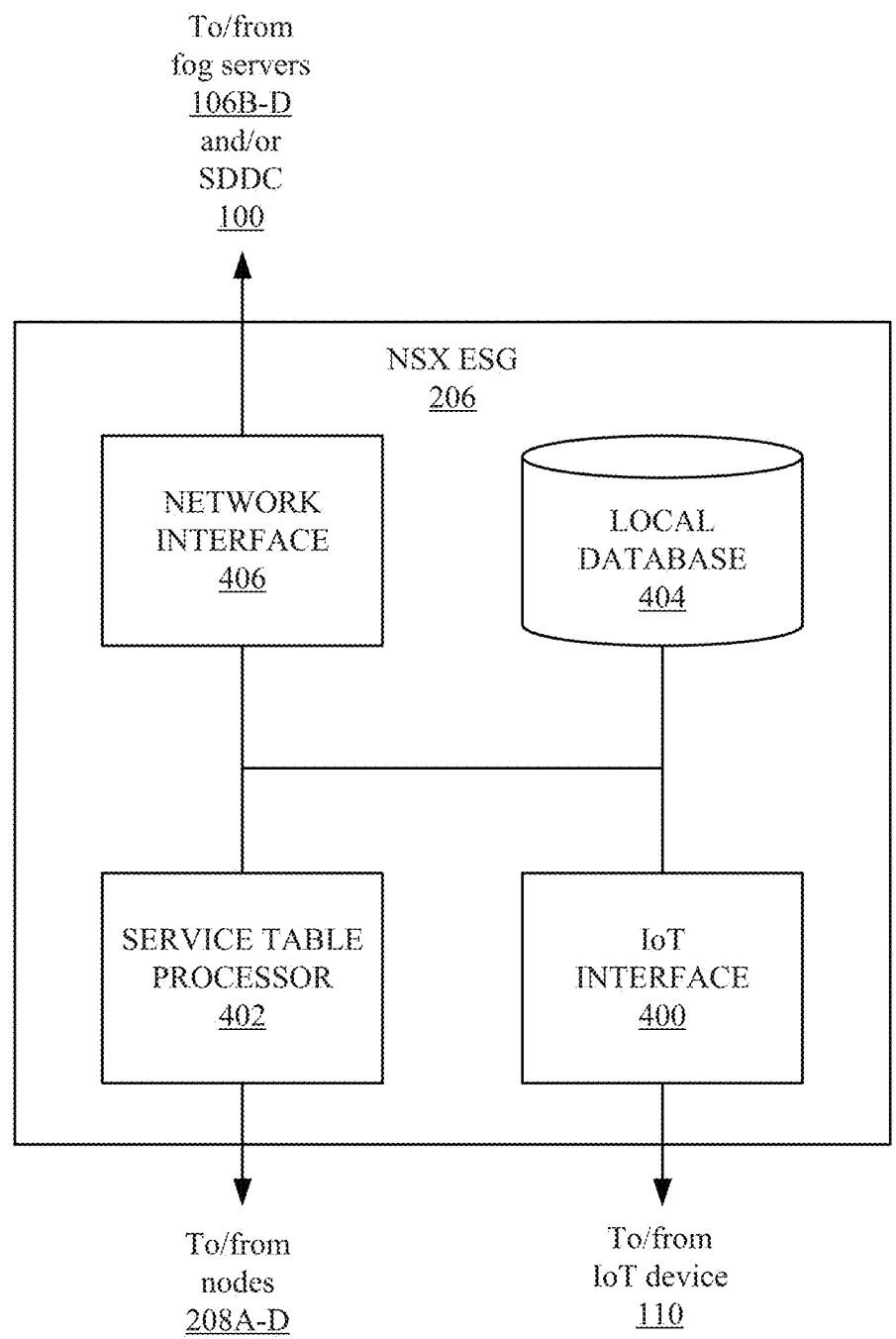
FIG. 4 is an example block diagram of an example network virtualized (NSX) edge service gateway (ESG) of FIGS. 1 and 2.

FIG. 4 is an example block diagram of the example NSX ESG 206 of FIGS. 1 and 2. Although FIG. 2 is described in conjunction with the example NSX ESG 206 of FIG. 1, the example implementation of FIG. 2 may be described in conjunction with any NSX ESG. The example NSX ESG 206 includes an example IoT interface 400, an example service table processor 402, an example local database 404, and an example network interface 406.

The example IoT interface 400 of FIG. 4 receives data and/or service requests from an IoT device (e.g., the example IoT device 108 of FIG. 1). The data and/or service request may be received directly from the IoT device 108 or may be received from a device (e.g., one or more gateways and/or servers) that is forwarding the service request from the IoT device 108. For example, the IoT device 108 may transmit data to a gateway running IoT software (e.g., Liota). The gateway may include a data center component (DCC) (e.g., a data-structure storing fog server and datacenter or SDDC details) indicating the datacenter or SDDC to which the IoT software is registered to. Accordingly, the example IoT interface 400 may transmit fog server details to be held at the DCC of the gateway. In this manner, when the gateway receives a service request from an IoT device, the gateway forwards the request to the fog server corresponding to the details at the DCC. In some examples, the IoT interface 400 may transmits instructions to the gateway to update its DCC to correspond to a different fog server (e.g., when a particular service request is not able to be performed by the local fog server). Additionally, when the service request is executed (e.g., locally or via another device), the example IoT interface 400 may transmit the service results to the example IoT device 108 (e.g., directly or via another device).

The example service table processor 402 of FIG. 4 determines if the example fog server 106A can service the request and, if not, facilitates the outsourcing of the service request. For example, when the IoT interface 400 receives a service request, the example service table processor 402 accesses the service table (e.g., stored in the example local database 404) to determine if there is an available node to execute the service. If the example service table processor 402 determines that a capable node is available locally (e.g., in the example fog server 106A), the example service table processor 402 transmits the service request to the corresponding node and the example service table processor 402 updates the service table to indicate that the node is currently servicing the request. If the example service table processor 402 determines that a capable node is not available locally, the service table processor 402 instructs the example network interface 406 to transmit the service request to the example fog resource manager 201. If the network interface 406 determines that the forwarded service request was not received by the example fog resource manager 201, the example service table processor 402 may select an alternate for resource manager from the whitelist of fog resource managers.

In response to forwarding the service request to the example fog resource manager 201, the example network interface 406 will receive at least one of service details (e.g., identifying an available fog server to execute the service) and/or service results (e.g., if the example SDDC 102 executed the service). In some examples, the service table processor 402 caches the service request in the service table in the example local database 404 (e.g., so that the service request is monitored but does not correspond to the local resource availability) and instructs the example network interface 406 to transmit the service request to the fog server identified in the service details. In some examples, the service table processor 402 instructs the IoT interface 400 to transmit instructions to the example IoT device 108 to modify the datacenter component (DCC) of the IoT software (e.g., Liota), so that the new fog server details are added to it, thereby indicating that the particular service is now available on another fog server (e.g., fog server 106B) instead of fog server 106A or the SDDC 102. In some examples, any updates to the DDC are transmitted to the example SDDC 102 for each IoT fog device that is registered to the SDDC 102. In such examples, the service table processor 402 determines if (A) client migration is enabled (e.g., based on communications and/or capabilities of the fog server 106A and the IoT device 108) and (B) if the fog server identified in the service details is within a threshold distance of the fog server 106A (e.g., which may be indicated in the service details).

The example local database 404 of FIG. 3 stores the service table (e.g., corresponding to the services offered by the fog server 106A and the availability of the services) and updates the service table when a new service request is being executed by the example fog server 106A and/or when a previous service request is no longer being executed by fog server 106A. Additionally, the example local database 404 may store a received whitelist from the example fog resource manager 201. The whitelist corresponds to alternate fog resource managers that should be used if the primary fog resource manager is down, not properly functioning, or otherwise unavailable.

The example network interface 406 of FIG. 4 receives deployed services, whitelists, service details, and/or service request results from the example SDDC 102 and/or the example fog serves 106B-D. Additionally, the example network interface 406 transmits resource updates (e.g., when a node is being used to execute a new service) and/or forwards service requests to the example SDDC 102 and/or one of the example fog servers 106B-D. In some examples, the network interface 406 and the IoT interface 400 may be combined into one interface.

While an example manner of implementing the FRM 201 of FIGS. 1 and 2 is illustrated in FIG. 3 and an example manner of implementing the NSX ESG 206 of FIGS. 1 and 2 is illustrated in FIG. 4, one or more of the elements, processes and/or devices illustrated in FIGS. 3 and/or 4 may be combined, divided, re-arranged, omitted, eliminated and/or implemented in any other way. Further, the example network interface 300, the example service manager 302, the example service table database 304, the example VRM interface 306, and/or, more generally, the example fog resource manager 201 of FIG. 3 and/or the example IoT interface 400, the example service table processor 402, the example local database 404, the example network interface 406, and/or, more generally the example NSX ESG 206 of FIG. 4 may be implemented by hardware, software, firmware and/or any combination of hardware, software and/or firmware. Thus, for example, any of the example network interface 300, the example service manager 302, the example service table database 304, the example VRM interface 306, and/or, more generally, the example fog resource manager 201 of FIG. 3 and/or the example IoT interface 400, the example service table processor 402, the example local database 404, the example network interface 406, and/or, more generally the example NSX ESG 206 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 300, the example service manager 302, the example service table database 304, the example VRM interface 306, and/or, more generally, the example fog resource manager 201 of FIG. 3 and/or the example IoT interface 400, the example service table processor 402, the example local database 404, the example network interface 406, and/or, more generally the example NSX ESG 206 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example the example fog resource manager 201 and/or the example NSX ESG of FIGS. 1 and/or 2 may include one or more elements, processes and/or devices in addition to, or instead of, those illustrated in FIGS. 3 and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
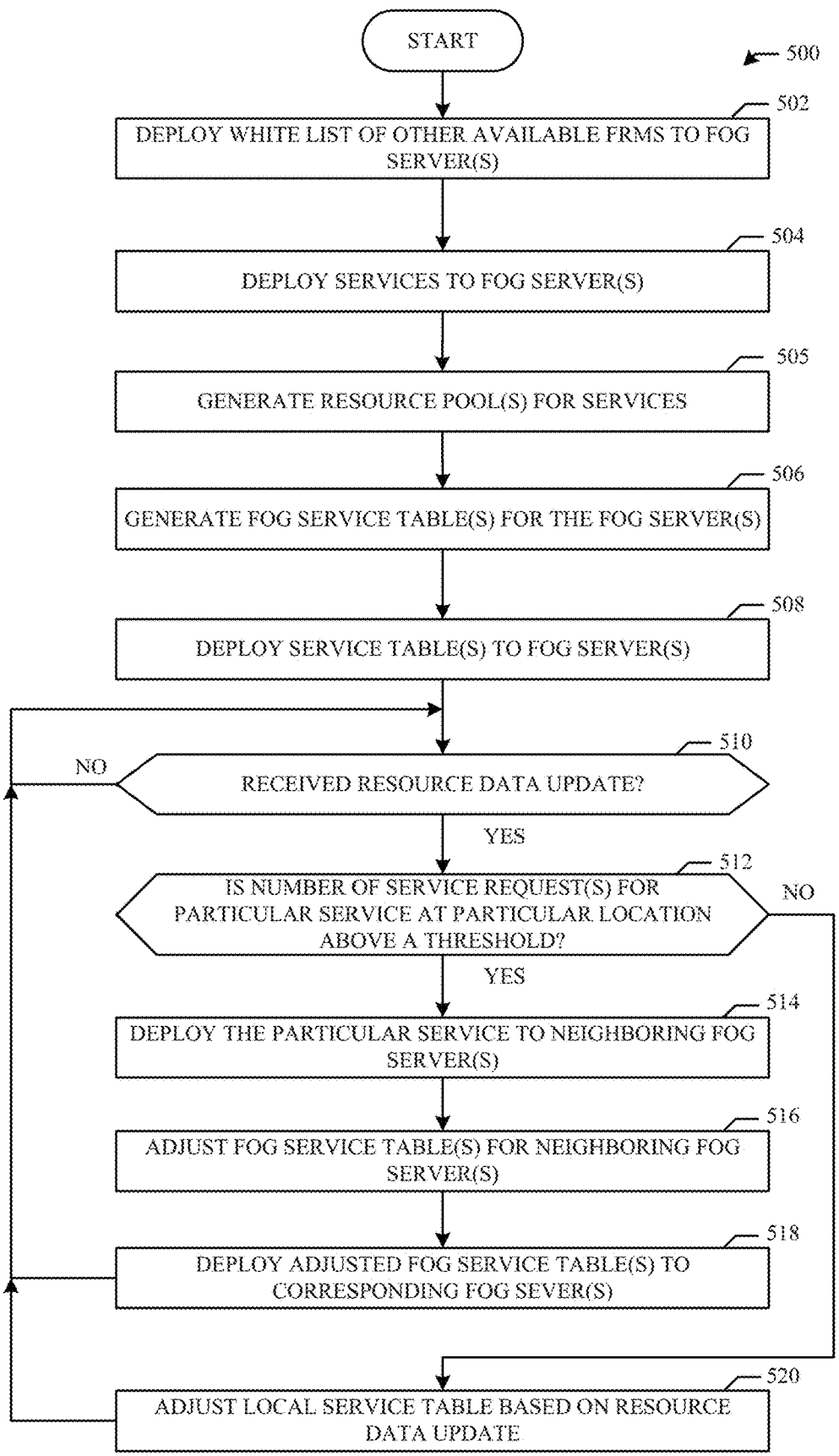
FIGS. 5 and 6 are flowcharts representative of machine readable instructions which may be executed to implement the example fog resource manager of FIG. 3.
Figure 6:
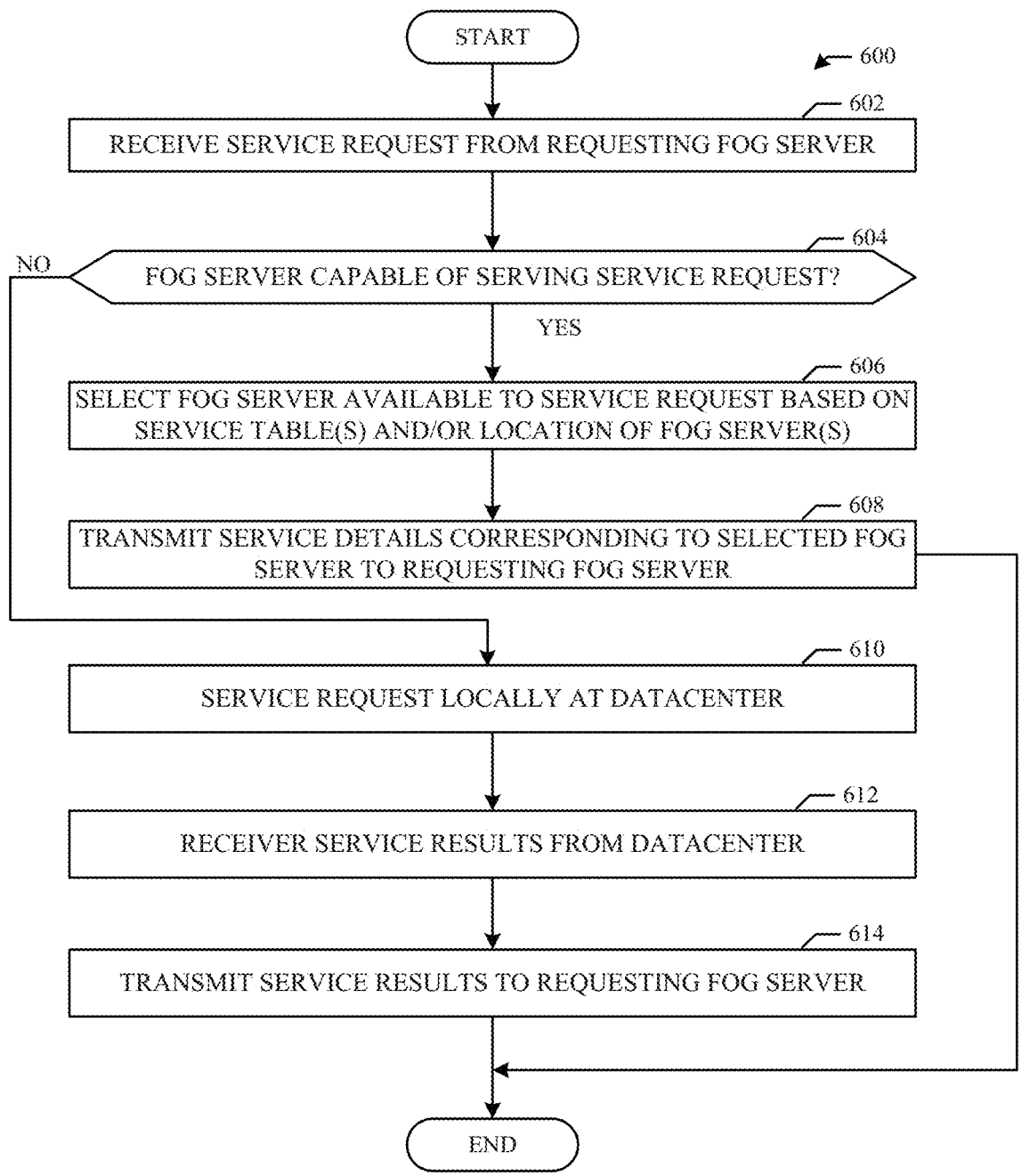
Figure 7:
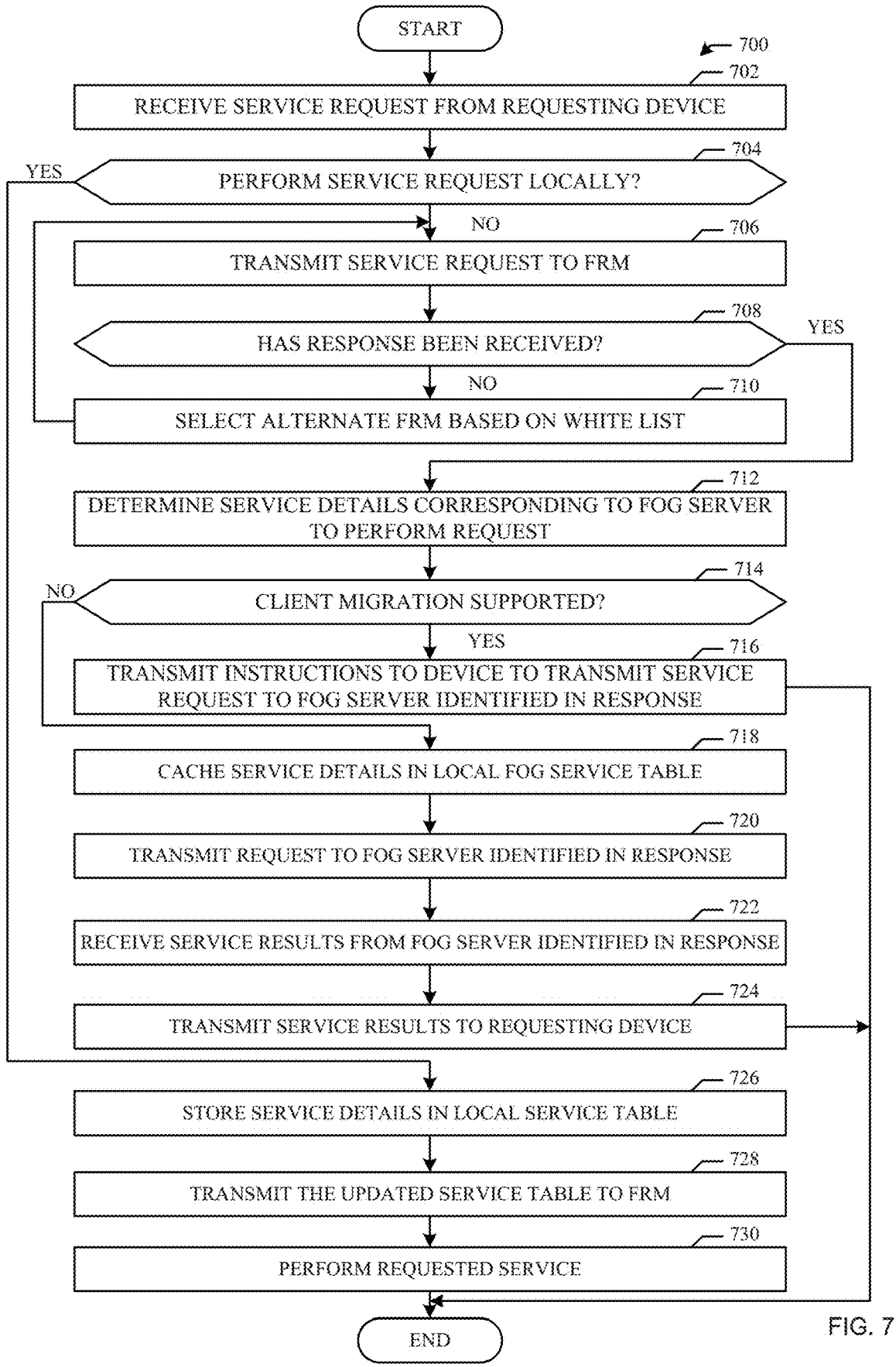
FIG. 7 is a flowchart representative of machine readable instructions which may be executed to implement the example NSX ESG of FIG. 4.

Flowchart representative of example hardware logic or machine readable instructions for implementing the FRM 201 of FIG. 3 are shown in FIGS. 5 and 6 and a flowchart representative of example hardware logic or machine readable instructions for implementing the example NSX ESG 206 of FIG. 4 is shown in FIG. 7. The machine readable instructions may be a program or portion of a program for execution by a processor such as the processor 812, 912 shown in the example processor platform 800, 900 discussed below in connection with FIGS. 8 and 9. The program may be embodied in software stored on a non-transitory computer readable storage medium such as a CD-ROM, a floppy disk, a hard drive, a DVD, a Blu-ray disk, or a memory associated with the processor 812, 912, but the entire program and/or parts thereof could alternatively be executed by a device other than the processor 812, 912 and/or embodied in firmware or dedicated hardware. Further, although the example program is described with reference to the flowchart illustrated in FIGS. 5-7, many other methods of implementing the example FRM 201 and/or the example NSX ESG 206 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 5 illustrates an example flowchart 500 representative of example machine readable instructions that may be executed by the example fog resource manager 201 of FIGS. 1-3 to dynamically discover and host services in fog servers. Although the flowchart 500 of FIG. 5 is described in conjunction with the example fog resource manager 201 of FIGS. 1 and 2, the instructions may be executed by any fog resource manager for any fog network.

At block 502, the example network interface 300 deploys (e.g., transmits) a whitelist corresponding to other fog resource managers (FRMS) that are capable of managing the example fog servers 106A-D. The example network interface 300 deploys the whitelist to the example fog servers 106AD via the example network 104. The example service manager 302 generates the white list based on the other FRMs available and online. At block 504, the example network interface 300 deploys services to the example fog servers 106A-D. For example, the network interface 300 transmits instructions to the example fog servers 106A-D to configure their nodes/execution units to be able to perform particular services. In response to receiving the services, the example NSX ESGs 206 of the example fog servers 106A-106D configure the example nodes/execution unit 208A-D to be able to execute such services. The example service manager 302 determines which service should be used by each fog server 106A-D. At block 505, the example service manager 302 generates resource pools of resources (e.g., vcpu, vmem, etc) pooled by each fog server. In this manner, when the example fog resource manager 201 receives a service request from a fog server, the example service manager 302 can easily identify a fog server that is capable of executing the request based on the generated resource pool corresponding to the request.

At block 506, the example service manager 302 generates fog service tables for each of the fog services and fog servers 106A-D. The fog service table corresponds to the deployed services for the fog servers 106A-D. For example, a first fog service table corresponds to the services that the first example fog server 106A is capable of performing. As described above, the fog service table may further include data related to available services for the fog server, node ports, node identifier, service type, name or service, resource availability, location of the fog server (e.g., determined when the fog server registered to the FRM after the fog server is imaged by the SDDS or a local administrator), etc. The location of the fog server may be determined by global positioning service (GPS) or by manually providing the location information using third party software. At block 508, the example network interface 300 deploys the generated service table(s) to the respective fog server(s) 106A-D. As further described below, the fog servers 106A-D update the service tables based on the services that are being utilized by the fog servers 106A-D (e.g., corresponding to which nodes/services are available or busy).

At block 510, the example network interface 300 determines if a resource data update has been received. For example, if the first fog server 106A receives a service request from the example IoT device 108 and decides to execute the service request, the first example fog server 106A updates the service table to reflect that a node/execution unit of the fog server 106A is being reserved to execute the service, and the example fog server 106A transmits the updated service table to the example fog resource manager 201 via the example network 104. In some examples, the updated service table corresponds to an execution time corresponding to how long the execution unit/node will be reserved for. In some examples, the fog server 106A transmits a follow-up updated service table when the node/execution unit is no longer reserved. If the example network determines that a resource data update has not been received (block 510: NO), the process returns to block 510 until a resource update is received. If the example network determines that a resource data update has been received (block 510: YES), the example service manager 302 determines if the number of service request(s) for a particular service (e.g., a service type) at a particular location are above a threshold (block 512). For example, if more than a threshold number of service requests for the same service is being requested at the second example fog server 106B and there are no or limited neighboring fog servers to help service the requests, the example service manager 302 may want to update the capable services of the fog servers located near the second example fog server 106B (e.g., to help with the large number of service requests).

If the example service manager 302 determines that the number of service requests for a particular service at a particular location is not above a threshold (block 512: NO), the example service manager 302 adjusts the local service table (e.g., stored in the example service table database 304) based on the resource data update (block 520), and the process returns to block 510 until another resource data update is received. If the example service manager 302 determines that the number of service requests for a particular service at a particular location is above a threshold (block 512: YES), the example network interface 300 deploys the particular service to neighboring fog server(s) (block 514). At block 516, the example service manager 302 adjusts the fog server table(s) for the neighboring fog server(s) that have configured their nodes/execution units to perform the deployed service(s). At block 518, the example network interface 300 deploys the adjusted fog service table(s) to the corresponding neighboring fog server(s).

FIG. 6 illustrates an example flowchart 600 representative of example machine readable instructions that may be executed by the example fog resource manager 201 of FIGS. 1-3 to dynamically discover and host services in fog servers. Although the flowchart 600 of FIG. 6 is described in conjunction with the example fog resource manager 201 of FIGS. 1 and 2, the instructions may be executed by any fog resource manager for any fog network.

At block 602, the example network interface 300 receives a service request from a requesting fog server (e.g., the example fog server 106A). As described above, when the example network interface 300 receives a service request from a requesting fog server, the requesting fog server is not capable of servicing the request locally and forwards the request for the example fog resource manager 201 to locate a fog server that is able to service the request. At block 604, the example service manager 302 determines if there is a fog server that is capable of serving the service request. For example, the service manager 302 processes the service tables for the fog servers 106A-D stored in the example service table database 304 to determine if one or more of the fog servers 106A-D are capable of servicing the request. If the example service manager 302 determines that there are no fog servers capable of servicing the request (block 604: NO), the process continues to block 610, as further described below.

If the example service manager 302 determines that there are one or more fog servers capable of servicing the request (block 604: YES), the example service manager 302 selects a fog server to service the request based on the service table(s) and/or the location of the fog server(s) (block 606). For example, if there are two fog servers capable of servicing the request, the service manager 302 may select the fog server that is located closest to the requesting fog server. In this manner, if client migration is supported by the example IoT device 108, the IoT device 108 may transmit the service request directly to the selected fog server. At block 608, the example network interface 300 transmits the service details corresponding to the selected fog server to the requesting fog server. In some examples, the service details include an address and/or identifier of the selected fog server and/or node/execution unit of the selected service table, a location of the selected fog server relative to requesting fog server (e.g., if the selected fog server is within the threshold distance to the requesting fog server to enable client migration), etc.

If the example service manager 302 determines that there are not one or more fog servers capable of servicing the request (block 604: NO), the example service manager 302 services the request locally at the example SDDC 102 (block 610) by instructing the example VRM interface 306 to transmit the service request to the example VRM backend 202. At block 612, the example VRM interface 306 receives the service results from the VRM backend 202 of the SDDC 102. At block 614, the example network interface 300 transmits the service results to the requesting fog server.

FIG. 7 illustrates an example flowchart 700 representative of example machine readable instructions that may be executed by the example NSX ESG 206 of FIGS. 1, 2, and/or 4 execute and/or outsource service requests. Although the flowchart 700 of FIG. 6 is described in conjunction with the example NSX ESG 206 of FIGS. 1, 2, and/or 3, the instructions may be executed by any NSX ESG in any fog server.

At block 702, the example IoT interface 400 receives a service request for a requesting device (e.g., the example IoT device 108). As described above, the example IoT interface 400 may receive the service request directly (e.g., from the IoT device 108) or indirectly (e.g., from one or more gateways and/or servers in communication with the example IoT device 108). At block 704, the example service table processor 402 determines if the service can be performed locally by the example fog server 106A. The example service table processor 402 determines if the service can be performed locally by processing the service table stored in the example local database 404. If the service table includes the requested service and the corresponding node(s)/execution unit(s) are not currently processing other service requests, the service table processor 402 determines that the service request can be performed locally.

If the example service table processor 402 determines that the service request can be performed locally (block 704: YES), the process continues to block 726, as further described below. If the example service table processor 402 determines that the service request cannot be performed locally (block 704: NO), the example network interface 406 transmits the service request to the example FRM 201 of the example SDDC 102 via the network 104 (block 706). At block 708, the example network interface 406 determines if a response has been received from the example SDDC 102. The response may be service details, service request results, and/or an acknowledgement. If the example network interface 406 determines that the response has not been received (block 708: NO), the example service table processor 402 accesses and processes the white list in the example local database 404 to select an alternate FRM to transmit the service request to (block 710) and the process returns to block 706. If the example network interface 406 determines that the response has been received (block 708: YES), the example service table processor 402 determines the service details corresponding to the fog server to perform the service request (block 712). Alternatively, if the example SDDC 102 serviced request, the example network interface 406 will receive the service results and the example IoT interface 400 may transmit the results (e.g., directly or indirectly) to the example IoT device 108.

At block 714, the example service table processor 402 determines if client migration is supported. Client migration may be enabled when the fog server selected to service the request is within a threshold distance of the example fog server 106A and the IoT device 108 is capable and desires client migration (e.g., based on initial negotiations between the IoT device 108 and the example fog server 106A). If the example service table processor 402 determines that client migration is supported (block 714: YES), the example IoT interface 400 transmits instructions to the example IoT device 108 to transmits the service request to the fog server identified in the response (e.g., the service details) (block 716). For example, the IoT interface 400 may send instructions to have the IoT gateway update its DCC to transmit service requests (e.g., all requests, some requests, or requests of the same type) to the selected fog server.

If the example service table processor 402 determines that client migration is not supported (block 714: NO), the example service table processor 402 caches the service details in the local fog service table (block 718). In this manner, the service table processor 402 is able to identify that the service request is being serviced, but the service table processor 402 does not restrict the fog server 106A from executing other service requests. At block 720, the example network interface 406 transmits the service request to the fog server identified in the response via the example network 104. At block 722, the example network interface 406 receives the service results from the fog server identified in the response. At block 724, the example IoT interface 400 transmits (e.g., directly or indirectly) the service results to the requesting device (e.g., the example IoT device 108).

If the example service table processor 402 determines that the service request can be performed locally (block 704: YES), the example service table processor 402 updates the table service in the example local database 404 to identify the execution units/nodes that will be reserved to execute the service request. At block 728, the example network interface 406 transmits the updated service table to the example FRM 201 via the example network 104. In this manner, the FRM 201 can track the available resources of the fog servers 106A-D. In some examples, the updated service table includes an execution time corresponding to the amount of time that the node/execution unit needs to execute the service request. At block 730, the example service table processor 402 instructs the fog server 406A to perform (e.g., execute) the requested service. For example, the service table processor 402 may transmit instructions to one of the example nodes, execution units, and/or pods to execute the service based on the service request. In some examples, the request is transmitted to orchestration frameworks (e.g., Kubernetes or docker swarm) and the orchestration frameworks carry out the required operations. Once the service request has been executed, the example service table processor 402 receives the service results and the example IoT interface 400 transmits (e.g., directly or indirectly) the service results to the example IoT device 108.

Figure 8:
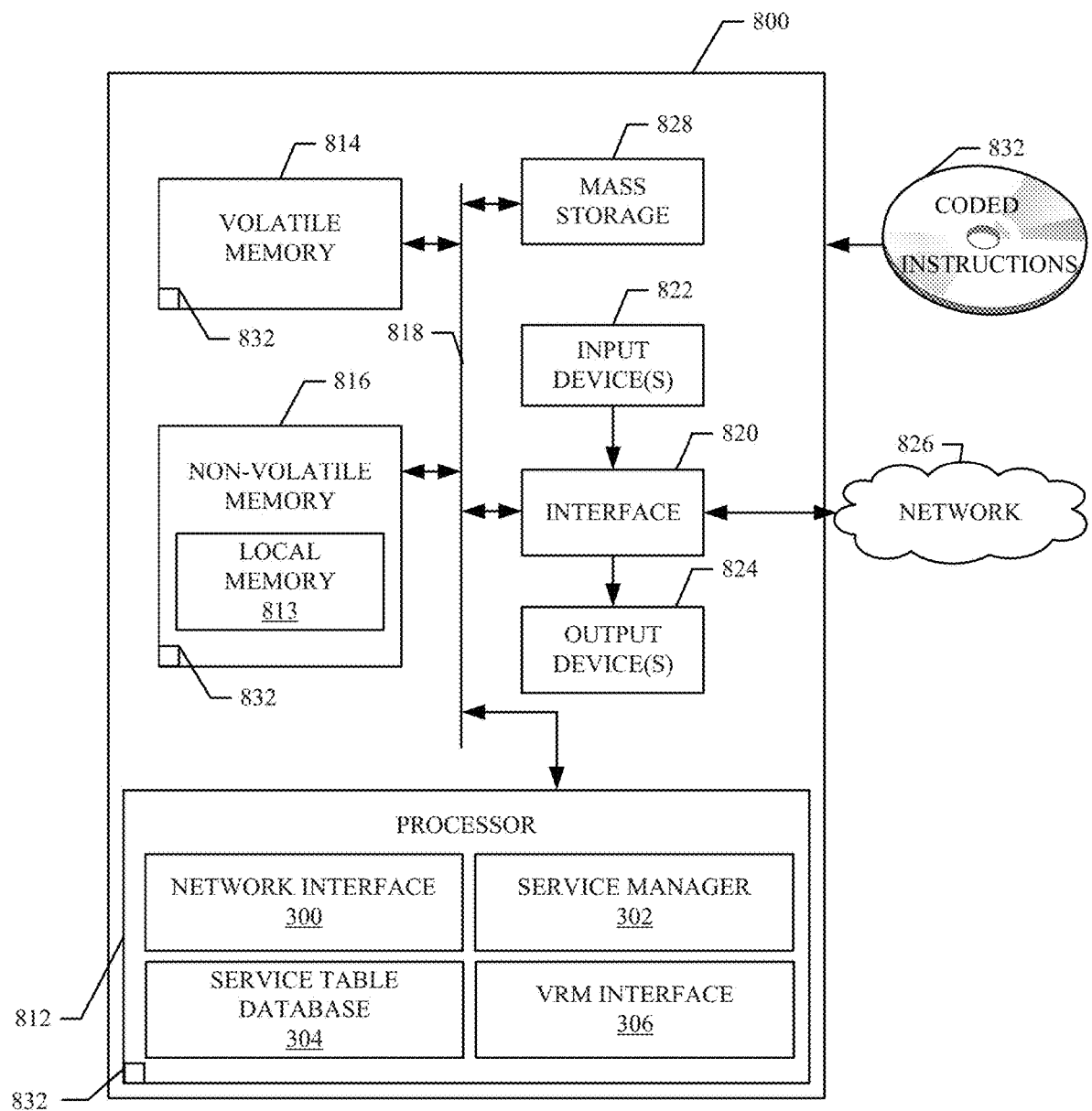
FIG. 8 is a block diagram of an example processing platform structured to execute the instructions of FIGS. 5 and 6 to implement the example fog resource manager of FIGS. 1-3.

FIG. 8 is a block diagram of an example processor platform 800 structured to execute the instructions of FIGS. 5-6 to implement the FRM 201 of FIG. 3. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 300, the example service manager 302, the example service table database 304, and/or the example VRM interface 306 of FIG. 3.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 5-6 may be stored in the mass storage device 828, in the volatile memory 814, in the nonvolatile memory 816, and/or on a removable non-transitory computer readable storage medium such as a CD or DVD.

Figure 9:
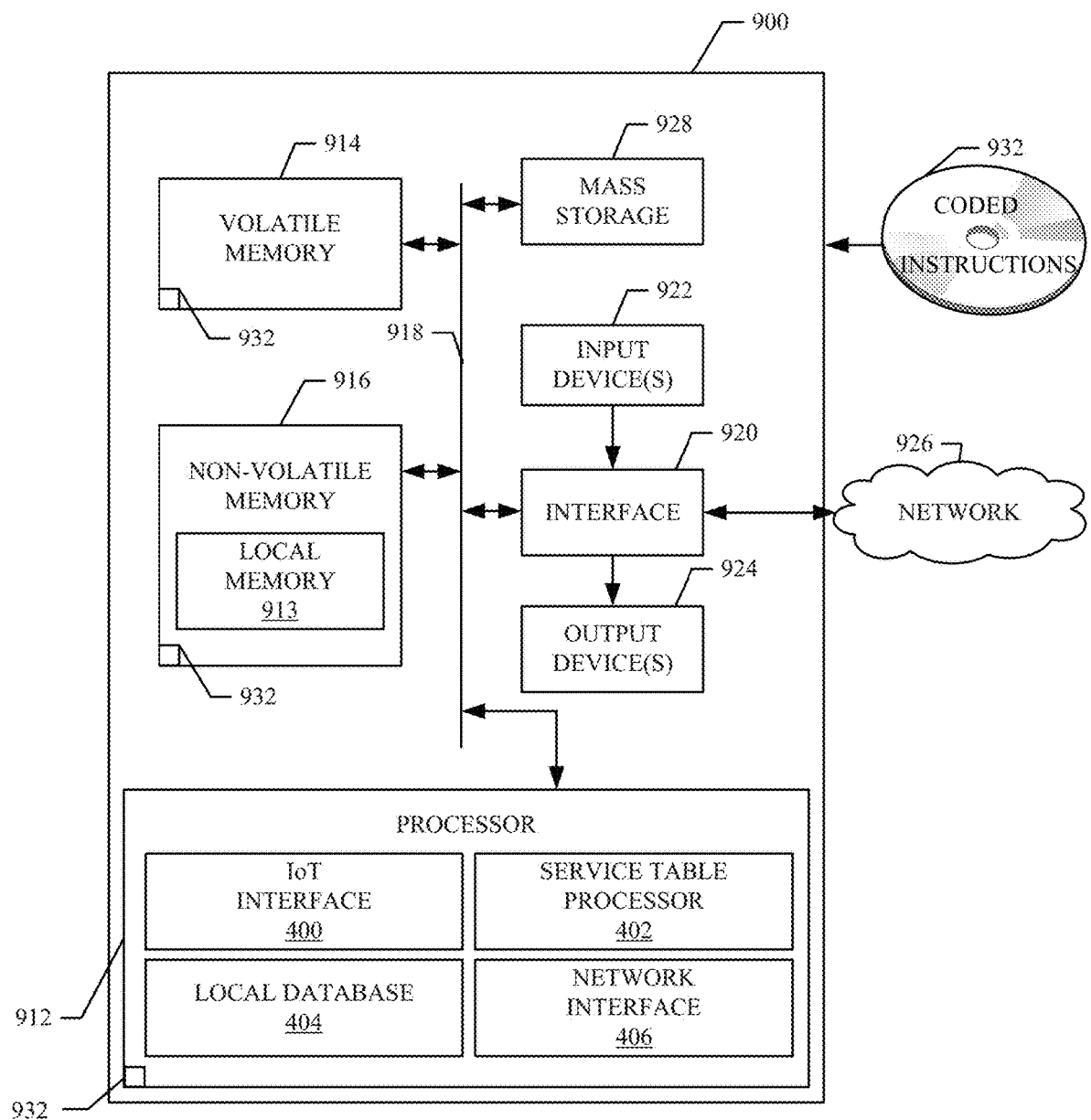
FIG. 9 is a block diagram of an example processing platform structured to execute the instructions of FIG. 7 to implement the example NSX ESG of FIGS. 1, 2, and 4.

FIG. 9 is a block diagram of an example processor platform 900 structured to execute the instructions of FIG. 7 to implement the example NSX ESG 206 of FIG. 4. The processor platform 900 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example IoT interface 400, the example service table processor 402, the example local database 404, the example network interface 406 of FIG. 4.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the nonvolatile memory 916, and/or on a removable non-transitory computer readable storage medium such as a CD or DVD.

From the foregoing, it will be appreciated that example methods, apparatus and articles of manufacture have been disclosed that dynamically discover and host services in fog servers. Examples disclosed herein include a fog resource manager to deploy services to a network of fog servers and manage the execution of such services to source service requests when one or more fog servers are unable to service received requests. Using examples disclosed herein, the speed and efficiency of fog computing is combined with the large resource power and flexibility of a network of fog servers, thereby increasing the flexibility and scalability of conventional fog computing techniques.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable medium comprising first instructions which, when executed, cause a machine to at least:
   determine a first fog server does not support a requested service from an Internet of Things (IOT) device, the determination based on a resource table of the first fog server, the resource table identifying services available via a plurality of fog servers including the first fog server; and
   when a distance between the first fog server and a second fog server is determined to be within a threshold distance and the second fog server can support the requested service, cause second instructions to be transmitted to the IoT device, the second instructions to command the IoT device to cause a request for the requested service be transmitted to the second fog server.

2. The non-transitory computer readable medium of claim 1, wherein the first instructions further cause the machine to track a number of resource requests currently being handled at the first fog server.

3. The non-transitory computer readable medium of claim 2, wherein the first instructions cause the machine to transmit the second instructions to the IoT device based the number of resource requests handled at the first fog server.

4. The non-transitory computer readable medium of claim 1, wherein the first instructions cause the machine to update the resource table when resource information indicates the first fog servers experienced an overload or the requested service is no longer supported.

5. The non-transitory computer readable medium of claim 1, wherein the second instructions cause the request for the requested service to be transmitted to the second fog server when a connection to a resource manager is unavailable, a response from the second fog server including service data related to the second fog server.

6. The non-transitory computer readable medium of claim 1, wherein the second instructions cause the second fog server to respond with service data related to the second fog server.

7. The non-transitory computer readable medium of claim 1, wherein the first instructions cause the machine to update a datacenter component of an IoT gateway to correspond to the second fog server.

8. An apparatus comprising:
memory; and
a processor to execute computer readable instructions to at least:
determine a first fog server does not support a requested service from an Internet of Things (IOT) device; and
when a distance between the first fog server and a second fog server is determined to be within a threshold distance and the second fog server can support the requested service, cause a command to be transmitted to the IoT device, the command to cause the IoT device to cause the request for the requested service be transmitted to the second fog server.

9. The apparatus of claim 8, wherein the determination that the first fog server does not support the requested service is based on a resource table of the first fog server, the resource table identifying services available via a plurality of fog servers including the first fog server.

10. The apparatus of claim 8, wherein the processor is to track a number of resource requests being handled at the first fog server.

11. The apparatus of claim 10, wherein the processor is to cause the command to be transmitted to the IoT device based the number of resource requests handled at the first fog server.

12. The apparatus of claim 8, wherein the processor is to update a resource table when workload information of the first fog server is available and when the requested service is no longer supported at the first fog server.

13. The apparatus of claim 8, wherein the processor is to update a datacenter component of an IoT gateway to correspond to the second fog server.

14. A method comprising:
determining, by executing an instruction with a processor, a first fog server does not support a requested service from an Internet of Things (IOT) device, the determining based on a resource table of the first fog server, the resource table identifying services available via a plurality of fog servers including the first fog server;
determining whether a distance between the first fog server and a second fog server is within a threshold distance; and
causing the IoT device to transmit the request for the requested service to the second fog server.

15. The method of claim 14, further including tracking a number of resource requests currently being handled at the first fog server.

16. The method of claim 15, further including causing the IoT device to transmit the request for the requested service to the second fog server based the number of resource requests handled at the first fog server.

17. The method claim 14, further including updating the resource table when a workload of the first fog server changes, and the first fog server no longer supports the requested service.

18. The method of claim 14, further including updating a datacenter component of an IoT gateway to correspond to the second fog server.

* * * * *